United States Patent [19]

Shumate

[11] 4,339,251
[45] Jul. 13, 1982

[54] FILTER BAG TENSIONING ARRANGEMENT

[75] Inventor: Eldridge J. Shumate, Louisville, Ky.

[73] Assignee: Allis-Chalmers Corporation, Milwaukee, Wis.

[21] Appl. No.: 318,635

[22] Filed: Nov. 5, 1981

[51] Int. Cl.³ .............................................. B01D 46/02
[52] U.S. Cl. ................................ 55/378; 55/341 NT; 73/862.42; 254/223; 254/380
[58] Field of Search .................... 55/378, 379, 341 R, 55/341 NT; 254/380, 270, 334, 376, 365, 223; 73/862.42, 862.44

[56] References Cited

U.S. PATENT DOCUMENTS

| | | | |
|---|---|---|---|
| 887,495 | 5/1908 | Murray et al. | 254/376 |
| 1,485,713 | 3/1924 | Rhoads | 73/862.42 |
| 1,978,999 | 10/1934 | Jones | 254/334 |
| 2,463,444 | 3/1949 | Thomas et al. | 254/365 |
| 3,001,763 | 9/1961 | Pilot | 254/376 |
| 3,217,468 | 11/1965 | O'Dell | 55/378 |
| 3,300,186 | 1/1967 | Lee | 254/334 |
| 4,003,727 | 1/1977 | O'Dell | 55/378 |
| 4,309,200 | 1/1982 | Heffernan | 55/378 |

*Primary Examiner*—Bernard Nozick
*Attorney, Agent, or Firm*—Thomas G. Anderson

[57] ABSTRACT

A movable winch adapted to be aligned on a guide track above each of the filter bags in a baghouse to secure the bags at a predetermined tension within the baghouse.

10 Claims, 10 Drawing Figures

U.S. Patent   Jul. 13, 1982   Sheet 2 of 2   4,339,251
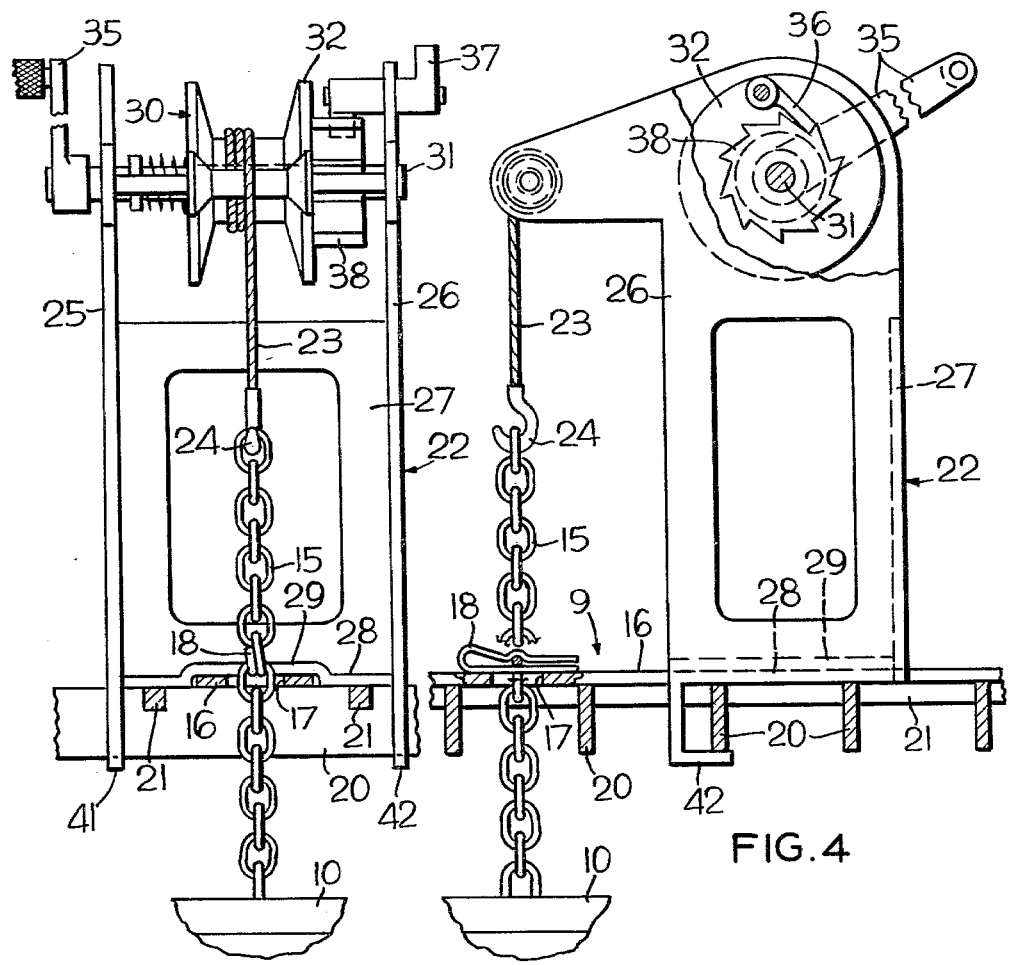
FIG. 4
FIG. 6
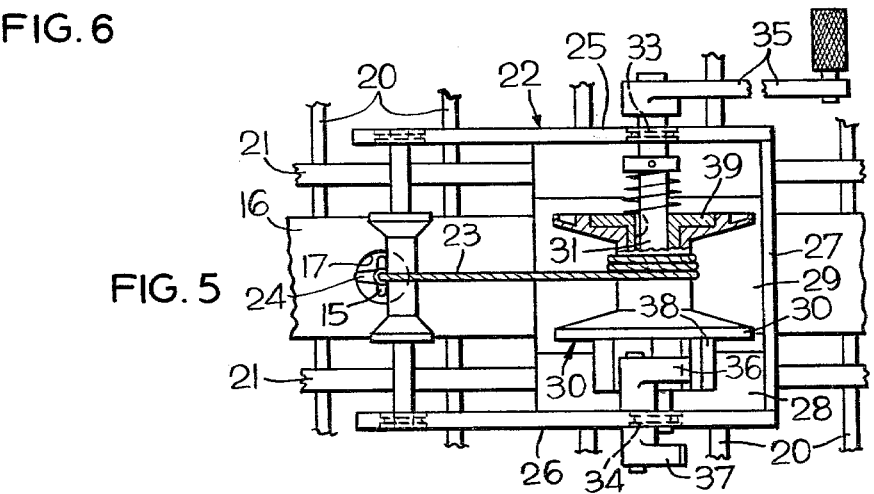
FIG. 5

4,339,251

FILTER BAG TENSIONING ARRANGEMENT

BACKGROUND OF THE INVENTION

1. Field of Invention

The present invention relates to a baghouse installation having a plurality of tubular filter bags and in particular to an apparatus for tensioning the filter bags within the baghouse.

2. Description of the Prior Art

In the typical baghouse installation for cleaning boiler flue gases, a plurality of tubular filter bags are suspended from a grating extending across the upper interior of the baghouse, and the lower ends of the bags are secured to an apertured tubesheet extending across the baghouse beneath the bags so that as the dirty gases enter the baghouse they flow into the interior of each of the filter bags whereafter they filter through the bags and ultimately flow out of the baghouse.

In installations of this type, the filter bags are generally secured in tension to prevent chafing between the adjacent filter bags as well as to prevent collapse of the bags during reverse-flow operations utilized to clean the bags. However, the procedures which have been used in the past to tension the filter bags have been relatively cumbersome and labor intensive. For example, in a typical baghouse having 200–400 filterbags, each of which is about a foot in diameter and 30 feet long, it has usually required two or more workmen to install the bags in the baghouse. More particularly, after securing the bottom of each of the bags to the tubesheet, the tops of the bags are secured to the grating, one at a time, by one of the workmen holding the bag in tension, usually at a tension in the range of 75–100 lbs., while the others measure the tension in the bag and secure it to the grating via a supporting strap or chain affixed to the top of the bag. When measuring the tension in one of the bags, the practice has been for the workmen to secure a spring scale or the like to the roof of the baghouse so that the tension can be measured by suspending the bag from the scale and then securing it to the grating when the desired tension is obtained. Thereafter, the tension in the remaining bags is approximated by securing those bags to the grating at the same distance from the grating as the first bag.

SUMMARY OF THE INVENTION

The present invention relates to a filter bag tensioning arrangement for a baghouse having a plurality of tubular filter bags and in particular to an arrangement for securing the filter bags at a predetermined tension within the baghouse.

The baghouse incorporating the invention includes a flow-through platform or grating secured across the top of the gas cleaning chamber. The filter bags are suspended in rows within the chamber by a strap or chain affixed to the closed upper end of each bag which is secured to the platform, and the lower ends of the bags are secured in flow-through relation to a tubesheet or apertured header plate forming the lower end of the gas cleaning chamber. Thus, during normal filtering operations, dirty gases flow through the tubesheet into the interior of the bags whereafter the gases filter through the bags into the gas cleaning chamber from where they are in turn exhausted from the baghouse.

To enable a workman to tension the filter bags when installing them in the baghouse, the invention provides a movable winch which is adapted to be aligned above each of the bags on a guide track in the platform aligned above each row of filter bags. This allows the workman to secure the winch cable to the strap affixed to the top of each bag and pull it upwardly until a predetermined tension is established in the bag, whereupon a cotter pin or the like is used to secure the strap to the platform. In this regard, it should be noted that the amount of tension in bag is automatically established by a slip clutch in the winch which releases when the desired tension is achieved, although it is to be understood that this can also be accomplished by connecting a spring scale between the winch cable and the strap of the bag being installed.

From the foregoing, it can be seen that the invention contemplates a tensioning arrangement of a relatively inexpensive and straight forward construction which enables a single workman to rapidly install the filter bags while at the same time assuring that all of the bags are tensioned uniformly within the baghouse. However, it is to be understood that various changes can be made in the arrangement, form, and construction of the apparatus disclosed herein without departing from the spirit and scope of the invention.

DESCRIPTION OF THE DRAWINGS

FIG. 4 is an enlarged side elevational view of the tensioning arrangement shown in FIG. 1;

FIG. 5 is an enlarged plan view of the tensioning arrangement shown in FIG. 1;

FIG. 6 is an enlarged end elevational view of the tensioning arrangement shown in FIG. 1;

DESCRIPTION OF THE PREFERRED EMBODIMENT

Figure 1:
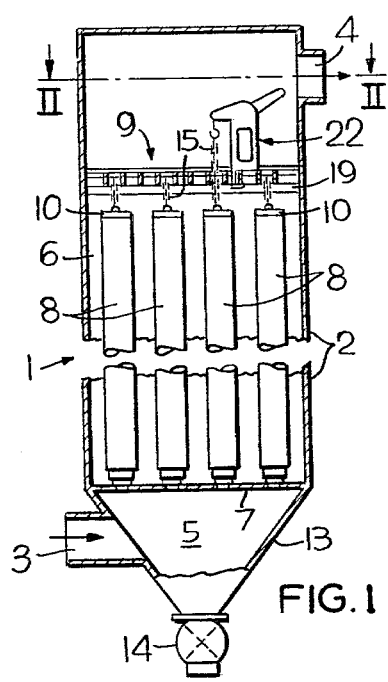
FIG. 1 is a side elevational view, partially in section, showing a baghouse incorporating the filter bag tensioning arrangement embodying the invention.
Figure 2:
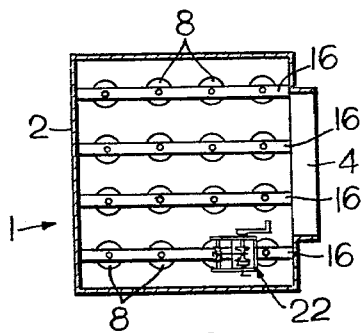
FIG. 2 is a plan cross-sectional view taken substantially along line II—II in FIG. 1.

As shown in FIGS. 1 and 2, a gas cleaning baghouse 1 incorporating the invention includes a housing 2 having a dirty gas inlet 3 and a clean gas outlet 4. The housing 2 is divided into a dirty gas chamber 5 and a gas cleaning chamber 6 by an apertured plate or tubesheet 7 secured across the interior of the housing. As will be described, a plurality of filter bags 8 are suspended in rows within the gas cleaning chamber 6 from a flow-through grating or platform 9 secured across the housing 2 above the filter bags.

Figure 3:
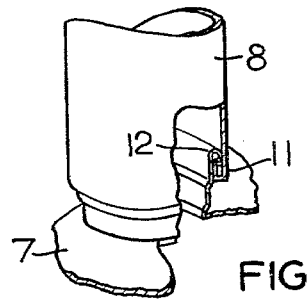
FIG. 3 is an enlarged partial isometric view showing the coupling between the bottom of one of the filter bags and the tubesheet separating the dirty gas chamber and the gas cleaning chamber.

Each of the filter bags 8 is closed on its upper end by a cap 10 and open on its lower end which is secured to the tubesheet 7 in flow-through communication with an associated aperture in the tubesheet. As shown in FIG. 3 and disclosed in detail in U.S. Pat. No. 4,003,727, the filter bags 8 are secured to the tubesheet 7 by a flexible collar 11 formed in the lower end of each of the filter bags which secures the bag to a tubular connector 12 affixed to the tubesheet about its associated aperture.

During gas cleaning operations the dirty gases are directed through the inlet 3 into the dirty gas chamber 5. The dirty gases flow from the dirty gas chamber 5 into the interior of each of the filter bags 8 where they filter through the bags into the gas cleaning chamber 6 and then flow out of the baghouse through the outlet 4. As the gases flow through the filter bags 8 dust and other particulate materials are separated from the gases in the interior of the bags. These materials ultimately drop into a hopper 13 enclosing the bottom of the baghouse where they are in turn removed from the hopper through a conventional discharge valve 14 at the base of the hopper 13 and disposed of.

Referring to the drawings, each of the filter bags 8 is suspended from a strap or chain 15 having one end secured to the cap 10 and its other end supported by a guide track or rail 16 secured to the flow-through grating 9 above each row of filter bags, it being understood that although it is not shown in the drawings, it has generally been the practice to connect the chain to the cap with a tension spring to allow for expansion and contraction of the baghouse during use. Each of the chains 15 extends through a corresponding aperture 17 provided in the track 16 in alignment with its associated filter bag 8 and is secured with a cotter pin 18 or the like which releasably secures the chain 15 to the track 16.

As noted above, the flow-though grating 9 supports the filter bags 8 while also providing an access platform for a workman when he is changing or adjusting the tension in the filter bags. The grating 9 is supported by two or more I-beams 19 or the like extending across the housing 2 and is similar to that used for walkways and the like in various manufacturing facilities in that it includes a plurality of laterally extending cross-members 20 interconnected by a plurality of bars or rods 21 extending perpendicular to the cross-members.

As shown in FIGS. 4-6 the invention includes a winch 22 which is adapted to be releasably secured to the grating 9 which includes a wire rope or cable 23 having a hook 24 on its free end which is adapted to be secured to the chain connected with each of the filter bags to pull the filter bag toward the grating. This arrangement enables a single workman to tension the filter bag and then secure it to the grating at the desired tension. The winch 22, which is preferably of a welded metal construction, includes a pair of spaced side frame members 25 and 26 interconnected by an end plate 27 and a base plate 28 having a channel or follower portion 29 formed in it which is adapted to embrace the guide tracks 16 to maintain the winch in alignment with the filter bags beneath it while preventing its lateral or twisting movement with respect to the track when it is used to tension the bags. The cable 23 is wound on a reel 30 mounted on a shaft 31 extending between the side members 25 and 26, and as shown in the drawings, it is carried by a freely rotatable guide pulley 32 which is similarly secured between the side members. The shaft 31 is rotatably supported by a pair of bearings 33 and 34 secured to the side members which carry the ends of the shaft, and a crank 35 is secured to one end of the shaft to enable the workman to rotate it to wind and unwind the cable on the reel, it being noted that a locking pawl 36 having a handle 37 is pivotally secured to the side member 26 which can be manipulated by the workman to engage a ratchet-type sprocket 38 affixed to the shaft 31 to prevent its rotation while he is securing one of the filter bags to the grating. Additionally, a conventional slip clutch 39 is connected between the shaft 31 and the reel 30 which will allow the reel to rotate relative to the shaft when the tension in the cable and the filter bag achieves a predetermined level. Thus, when securing one of the filter bags at the desired tension, the workman simply connects the hook 24 on the end of the cable to the bag's supporting chain 15 and rotates the crank 35 to wind the cable until the slip clutch 39 allows the reel 30 to rotate relative to the shaft 31, whereafter he engages the pawl 36 on the sprocket 38 to prevent the cable from unwinding and secures the chain with the cotter pin 18.

Figure 7:
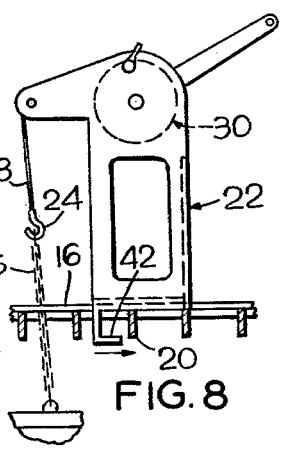
FIG. 7–9 illustrate how the tensioning arrangement is releasably secured within the baghouse.
Figure 8:
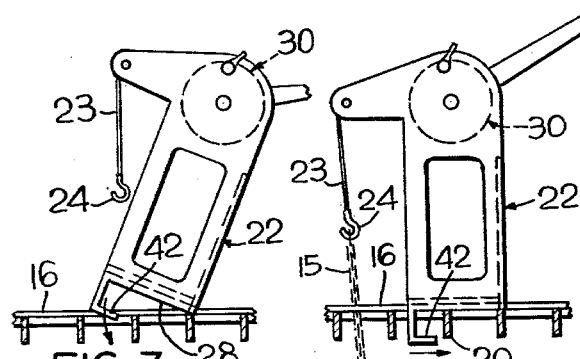
Figure 9:
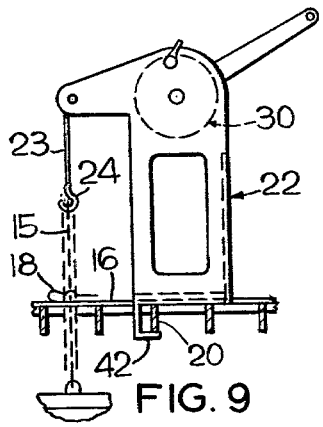

The winch 22 is adapted to be releasably secured to the grating 9 when it is utilized to tension and secure the filter bags. For this purpose, the winch includes a pair of L-shaped lugs 41 and 42 extending downwardly from the base plate 28 which are adapted to releasably engage one of the crossmembers 20 adjacent the filter bag being secured to the grating. As illustrated in FIGS. 7-9, this arrangement enables the workman to tilt the winch and slide it along the guide track 16 until it is positioned adjacent to the filter bag which is to be secured. In this regard, it should be noted that a pair of rollers or wheels can also be secured to the side members to enable the workmen to roll the winch along the guide track if desired. Next, the workman pivots the winch down to insert the lugs 41 and 42 between the crossmembers 20 and slides it away from the filter bag until the lugs embrace the crossmember as shown in FIG. 9. Then, after tensioning and securing the filter bag as described above, the workman reverses this procedure and slides the winch along the track to the next filter bag where the winch is again secured to one of the cross members and the process repeated.

Figure 10:
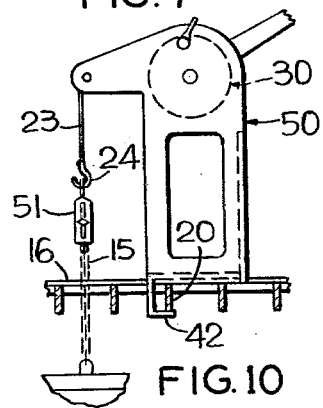
FIG. 10 is an enlarged side elevational view of an alternative embodiment.

FIG. 10 shows an alternative arrangement wherein elements similar to those in the first embodiment are identified with the same numerals as those used in FIGS. 1-9. In the alternative embodiment, which is the same as the first embodiment except that it does not include a slip clutch, a conventional spring scale 51 is secured between the hook 24 and the end of the chain 15 to measure the tension in the filter bag. Thus, when installing one of the filter bags, the workman simply winds the winch 50 until the desired tension is indicated on the scale 51, whereafter he locks the reel 30 in position by engaging the pawl 36 with the sprocket 38 and secures the chain 15 with the cotter pin 18 as in the first embodiment.

The embodiments of the invention in which an exclusive property or privilege is claimed are defined as follows:

1. A filter bag tensioning arrangement for a baghouse having a gas cleaning chamber, a flow-through filter supporting platform extending across the top of the gas cleaning chamber, a plurality of filter bags arranged in rows extending widthwise of the gas cleaning chamber, each of said bags being suspended from a supporting strap connected with the upper end of the bag, and attachment means anchoring the lower end of each of the filter bags within the baghouse, comprising:
    a guide track in the platform aligned above each row of filter bags;
    winch means including a follower adapted to be engaged with the track above one of said rows to enable a workman to selectively align said winch means above one of the filter bags in said row while restraining its lateral movement with respect to the track, downwardly projecting coupling means releasably engageable with the platform upon selective widthwise movement of said winch means with respect to the platform, and a supporting cable adapted to be secured to the strap of said one of the bags to pull it toward the platform upon actuating said winch means to establish a predetermined tension in said bag; and fastening means for releasably securing said strap to the platform to support and maintain the tension in said bag.

2. The tensioning arrangement according to claim 1; and said winch means being of a welded metal construction.

3. The tensioning arrangement according to claim 1; and said platform being formed of a grating having a plurality of spaced cross-members extending generally perpendicular to the guide track; and said coupling means including a pair of L-shaped lugs slidingly engageable about a selected cross-member proximate each of the filter bags.

4. The tensioning arrangement according to claim 1; and said guide track having a plurality of apertures, each of said apertures being in alignment with one of the filter bags such that the strap connected with each of the bags can extend through its associated aperture.

5. The tensioning arrangement according to claim 4; and said strap being a length of chain and said fastening means being a pin engaged through one of the links of said chain supported on the guide track.

6. The tensioning arrangement according to claim 1; and said winch means including a housing having a pair of spaced side members, a base member interconnecting the side members having a channel formed in it which generally contiguously engages the guide track to provide said follower, a reel rotatably supported between the side members having the cable wound around it, and winding means for rotating the reel to selectively extend or retract the cable to tension the filter bag suspended from the cable.

7. The tensioning arrangement according to claim 6; and said winding means being a crank secured to said reel.

8. The tensioning arrangement according to claim 6; and said winding means including a slip clutch allowing an operator to automatically establish a predetermined tension in the filter bag suspended from the cable upon actuating the winding means.

9. The tensioning arrangement of claim 6; and a spring scale interconnecting said strap and cable including indicia indicating the tension in the bag.

10. The tensioning arrangement according to claim 6; and said winch means including guide means suspending the cable from one end of the side members; and said coupling means including an L-shaped lug spaced inwardly of said guide means releasably engaging the platform upon sliding the housing toward the opposite end of the side members.

* * * * *